United States Patent [19]
Achkar et al.

[11] Patent Number: 5,259,577
[45] Date of Patent: Nov. 9, 1993

[54] ATTITUDE CONTROL SYSTEM FOR THREE-AXIS STABILIZED SATELLITE IN NEAR-EQUATORIAL ORBIT

[75] Inventors: Issam-Maurice Achkar, Cannes-la-Bocca; Pierre Guillermin, Nice, both of France

[73] Assignee: Aerospatiale Societe Nationale Industrielle, Paris, France

[21] Appl. No.: 806,607

[22] Filed: Dec. 12, 1991

[30] Foreign Application Priority Data

Dec. 12, 1990 [FR] France .................. 90 16149

[51] Int. Cl.$^5$ ................................. B64G 1/24
[52] U.S. Cl. ........................ 244/164; 244/165; 244/166
[58] Field of Search ............ 244/158 R, 164, 165, 244/166, 169, 170

[56] References Cited
U.S. PATENT DOCUMENTS

| | | |
|---|---|---|
| 3,813,067 | 5/1974 | Mork .................... 244/165 |
| 4,010,921 | 3/1977 | Pistiner et al. . |
| 4,071,211 | 1/1978 | Muhlfelder et al. . |
| 4,114,841 | 9/1978 | Muhlfelder et al. ........... 244/166 |
| 4,521,855 | 6/1985 | Lehner et al. . |
| 5,149,022 | 9/1992 | Flament .................... 244/164 |

FOREIGN PATENT DOCUMENTS
2525359 10/1983 France .

*Primary Examiner*—Galen Barefoot
*Attorney, Agent, or Firm*—Remy J. VanOphem

[57] ABSTRACT

A roll/yaw attitude control system for a three-axis stabilized satellite in an at least approximately Equatorial orbit embodies a processor circuit connected between a roll, yaw and pitch attitude sensing device including a terrestrial sensor and a stellar sensor adapted to detect the Pole Star and an actuator device having a kinetic moment system substantially oriented along the pitch axis and a magnetic dipole generator system disposed at least approximately in a roll/yaw plane. The processor circuit embodies a short-term roll/yaw control loop adapted to estimate the roll and yaw attitude angles and angular speeds and to determine set point signals for some elements of the actuator device and a long-term roll/yaw control loop adapted to estimate roll/yaw attitude angles and external disturbances and to determine a dipole signal to be applied to the magnetic dipole generator system or to backup actuators.

17 Claims, 18 Drawing Sheets

* POLE STAR

ATTITUDE CONTROL SYSTEM FOR THREE-AXIS STABILIZED SATELLITE IN NEAR-EQUATORIAL ORBIT

BACKGROUND OF THE INVENTION

1. Field of the Invention

The invention concerns active roll and yaw control of a satellite with onboard kinetic moment in equatorial or near-equatorial (less than 10° inclination) orbit stabilized about three axes.

2. Description of the Prior Art

There are various known systems of attitude control for three-axis stabilized satellites with onboard kinetic moment, in other words embodying one or more momentum wheels whose resultant kinetic moment always has a non-null value, so generating a gyroscopic stabilization effect.

For example, French Patent No. 2,522,614 (MOUIL-HAYRAT et al of CENTRE NATIONALE D'ETUDES SPATIALES) concerns a satellite having a platform stabilized to face the Sun and a payload mounted to rotate about a North-South axis relative to the platform so as to remain stabilized with reference to the Earth. To generate attitude correction torques the platform contains actuators in the form of a momentum wheel with its axis perpendicular to the North-South axis and a reaction wheel; their rotation speeds are controlled according to information on the attitude of the platform provided by solar and stellar sensors. Rotation of the payload relative to the platform is controlled according to the output of a terrestrial sensor which does not cooperate with the solar and stellar sensors.

French Patent No. 2,637,565 (MAUTE of AEROSPATIALE) describes an attitude control system for geostationary satellites using signals from terrestrial, solar and stellar sensors to control actuators which can be reaction wheels, momentum wheels or thrusters. A number of processing lines are provided in parallel, representing various modes of operation.

French Patent No. 2,319,150 (MUHLFELDER and SCHMIDT of RCA CORPORATION) concerns a satellite in synchronous orbit with fixed kinetic moment oriented on the pitch axis and where the requirement is to dispense with any measurement of attitude in yaw. Only the roll attitude is measured (using a horizon sensor) and attitude correction is applied if the attitude in roll is incorrect by an amount exceeding a threshold (binary triggering) using a magnetic coil in the roll-yaw plane interacting with the terrestrial magnetic field.

French Patent No. 2,498,155 (MUHLFELDER, PHILIPS and BALSNIK of RCA CORPORATION) describes an improvement to the just previously mentioned patent introducing a time-delay into the generation of the magnetically sourced correcting torque determined according to the period of nutation of the satellite.

The U.S. Pat. NO. 4,294,420 (BROQUET of MATRA) describes a satellite having two momentum wheels in a V configuration in a plane containing the pitch axis and rotation of which is controlled according to attitude measurements in roll and in pitch supplied by terrestrial sensors. The kinetic moment can be oriented with one degree of freedom. The attitude is stabilized in yaw by passive means in the short term, using gyroscopic techniques, and possibly complemented by the use of thrusters or magnetic coils for long-term corrections.

U.S. Pat. No. 4,521,855 (LEHNER and LEBSOCK of FORD AEROSPACE) concerns roll-yaw control of a satellite which explicitly dispenses with a stellar sensor and uses a kinetic moment which can be oriented in the pitch/yaw plane. Only the attitude in roll is measured; a high-speed roll loop determines variations in the speed of the wheels and a low-speed yaw loop (of the LUENBERGER type) controls a single magnetic coil on the yaw axis.

The article published in Proceedings of AOCS conference, Noordwijk, Netherlands, 3-6 October 1977, ESA SP-128 November 1977, pp. 103-110 (LACOMBE J. L.) under the title "Magnetotorquing for the attitude control of geostationary satellites" describes a method of designing a magnetic roll-yaw control system for three-axis stabilized geosynchronous satellites using two wheels in a V configuration and proposes to generate the onboard magnetic dipole according to a law based on the well-known WHECON control method used with thrusters. To this end the axis of the coil is offset to the yaw axis by an angle $\alpha$ approaching 45° and the modulus of the magnetic dipole generated is determined by the roll angle as measured by a terrestrial sensor.

The article published in Journal of Guidance and Control, Vol. 2; no 4 - July-August 79, pp. 334-338 (GOEL P. L. and RAJARAM S.) under the title "Magnetic attitude control of a momentum-biased satellite in near equatorial orbit" describes a closed loop roll/yaw magnetic control system for a three-axis stabilized satellite with fixed kinetic moment. The roll error, measured by a terrestrial sensor, is filtered to provide two components: a component at the orbital angular frequency and a component at the nutation angular frequency. A magnetic coil on the roll axis is then energized so that its magnetic dipole is a linear function of these two components to provide simultaneously short-term and long-term attitude control.

The article published in Acta Astronautica, Vol 9, no 12, 1982, pp. 697-702 under the title "Advanced reaction wheel regulator for attitude control of spacecraft" (TSUCHIYA K., INOUE M., WAKASUQI N. and YAMAGUCHI T.) describes an original law for short-term roll/yaw control in the case of a satellite having a pitch momentum wheel and a yaw reaction wheel. In this system the reaction wheel control law implements the modern state variable control technique to the roll angle as measured by the Earth sensor and to the roll and yaw angular speeds as estimated by means of a minimal second order Luenberger sensor. The only attitude measurements are provided by a terrestrial sensor.

Finally, HUBERT and BRUNO in "Nutation damping using a pivotal momentum wheel", an article published in: Journal of Guidance, Control and Dynamics, Vol. 12, no 5, Sept.-Oct. 89, pp.756-757, describe a system for damping nutation of the pitch axis (or for short-term roll/yaw control) for a satellite having a kinetic momentum that can be oriented by means of a momentum wheel on a pivot. Pivoting about an axis parallel to the roll axis is actuated by a stepper motor controlled by non-linear logic sensing the change of sign of the roll angular speed. The latter speed is measured by means of a rate gyro or calculated by differentiating the roll angle as measured by an Earth sensor.

The signal obtained is then filtered by a bandpass filter centered on the satellite nutation angular frequency.

An object of the invention is to offer improved performance as compared with the above solutions, that is durable in time and has no excessive penalty in terms of cost or mass.

The invention is directed to attitude control of three-axis stabilized satellites with onboard kinetic moment in equatorial or near-equatorial orbit that is highly accurate in yaw and in roll, for example to within 0.02°, has a moderate mass, is simple and of reasonable cost, and requires no significant consumption of energy (especially in the form of propellants), whereby it meets in particular requirements for pointing of future optical telecommunications satellites or second generation direct TV broadcast satellites.

SUMMARY OF THE INVENTION

The invention is a roll/yaw attitude control system for a three-axis stabilized satellite in Equatorial or near-Equatorial orbit. The system of the present invention includes a device for sensing the attitude of the satellite in roll, in yaw and in pitch embodying a terrestrial sensor and a stellar sensor adapted to detect the Pole Star.

The system also includes multi-element actuator device embodying a system with a kinetic moment having a non-null value at all times and a dominant component along the pitch axis and a magnetic dipole generator system disposed at least approximately parallel to the roll/yaw plane and a set of backup actuators.

The system further includes processor circuit connected between the attitude sensing device and the actuator device. The processor circuit is a short-term roll/yaw control loop constituting a state estimator for estimating on the basis of measurements from the sensing device the roll and yaw attitude angles and angular speeds and a preselected gain controller for determining from estimated angle and angular speed values set point signals fed by distribution logic to at least some of the elements of the actuator device, and a long-term roll/yaw control loop constituting a state estimator for estimating on the basis of measurements from the sensing device roll and yaw angles and components along the roll and yaw axes of exterior disturbing torques and a controller for determining via distribution logic a dipole signal to be applied to the magnetic dipole generator system and, in parallel with the controller, a backup system adapted to send control signals to the set of backup actuators.

According to preferred features of the invention the kinetic moment system of the actuator device has a fixed kinetic moment;

the set point signals supplied by the controller of the short-term control loop are applied to the magnetic coils and the dipole determined by the controller of the long-term control loop is added to the set point signals;

the kinetic moment system of the actuator device has an orientable kinetic moment with one degree of freedom about an axis at least approximately parallel to the roll axis; and the orientable kinetic moment system embodies tachometers supplying speed signals to the long-term control loop.

A satellite for which the invention is intended has a kinetic moment which has a non-null value at all times and whose dominant component is oriented on the pitch axis. This non-null kinetic moment can be fixed (case 1) or orientable (case 2) with one degree of freedom about an axis near the roll axis.

A fixed kinetic moment can be generated by a momentum wheel whose rotation axis is near the pitch axis, for example. An orientable kinetic moment can be generated using a pitch momentum wheel and a yaw reaction wheel, for example, or two wheels in a V configuration about the pitch axis and a reaction wheel in the roll/yaw plane (on the yaw axis, for example), or a single momentum wheel mounted on a pivot substantially transverse to the pitch-yaw plane (the pivot is then advantageously provided with an actuator, for example an electrical stepper motor, and a position sensor).

The satellite is provided with two magnetocouplers in the form of magnetic coils whose axes are preferably orthogonal and near or included in the roll/yaw plane and further includes other actuators, thrusters for example, capable of generating torque about the roll and yaw axes in particular.

Attitude error in roll and in pitch is measured by means of a terrestrial sensor, an infrared sensor for example, while yaw is determined using a stellar sensor having a field of view in the order of 2×(orbital inclination+3°) and an opto-electronic sensitivity such that it can sense the Pole Star at all times (this star is approximately 1° from the geographical North pole).

It will be understood that in the normal mode of operation of the satellite (which can be a telecommunications satellite or a remote sensing satellite or a scientific experiment satellite, as already explained), the attitude control system points the payload (antennas, optical instruments, radar, etc) by keeping not only the roll and yaw angles but also their derivatives within assigned and optionally variable ranges.

To achieve this the appropriate control logic processes simultaneously the angular measurements from the terrestrial and stellar sensors and, if necessary, the wheel rotation speeds measured by the associated tachometers, with the aim of defining the set point kinetic moments (or torques) for these wheels and also the control dipoles (or currents) for the magnetic coils or, where appropriate, the control signals for other actuators.

The system in accordance with the invention for automatically correcting error in roll and in yaw is thus operative in the short and long terms.

Pitch control is not part of this invention and may be effected by any appropriate known means, for example using momentum wheels and desaturation actuators such as the thrusters primarily intended for East-West orbit control.

Two control loops are typically used:

a fast loop whose objective is to reduce the angular speed of roll and of yaw and generally to provide short-term roll/yaw control; in the case of a satellite with a fixed kinetic moment control is provided by the coils whereas in the case of a satellite with a variable kinetic moment the actuators are momentum/reaction wheels; and a slow loop intended to compensate the effects on the attitude of the satellite of exterior disturbing torques, which represents a long term control function, by varying the dipoles generated by the magnetic coils or by appropriately controlling other type actuators.

In practice, the logic implementing these loops is implemented onboard the satellite by means such as a computer using constant or variable gains and scaling factors programmed into an associated memory unit. An alternative approach is to process the sensor measurements and to control the actuators from the ground.

As compared with French Patent No. 2,522,614 and 2,637,565, the invention has the advantage of optimizing the use of the momentum and/or reaction wheels, in combination with magnetic coils, for short-term and long-term roll/yaw control using Earth and Pole Star sensors.

As compared with French Patent No. 2,319,150 and 2,498,155, which relate to a fixed kinetic moment, the present invention proposes to damp nutation by controlling the coils not according to the roll angle filtered and compared with one or more thresholds but in a linear manner according to the roll and yaw angles measured by the Earth and Pole Star sensors and also according to the roll and yaw angular speeds estimated by means of a status observer. This significantly improves control performance, especially with regard to the rate of reducing speeds and resetting angles and the minimizing of residual errors.

In comparison with U.S. Pat. No. 4,521,855 (orientable kinetic moment), the invention has advantages including the fact that it ensures, by virtue of the slow loop based on the combined measurement of roll and yaw using Earth and Pole Star sensors, comparable satellite pointing performance in roll and in yaw, typically better than 0.02° on each axis (undisturbed magnetic field) as compared with 0.02° in roll and 0.1° in yaw of the system of U.S. Pat. No. 4,521,855. The performance achieved by the present invention is therefore particularly suited to the fine pointing requirements of modern optical telecommunications satellites using laser beams and second generation direct TV broadcast satellites and even remote sensing satellites (meteorological satellites, for example) stabilized on three-axes with fixed or orientable onboard kinetic moment.

As compared with U.S. Pat. No. 4,521,855, the present invention proposes a totally different and improved performance method for the fast roll/yaw control loop and further provides for control by other actuators, such as thrusters, based on simplified logic and whose object is to back up the coils in the event of malfunction or serious disturbance of the magnetic field (as occurs during solar flares in particular).

In comparison with U.S. Pat. No. 4,294,420 (orientable kinetic moment), the present invention is distinguished by the sensing of yaw using the Pole Star sensor and by the estimation of roll and yaw angular speeds, which significantly improves performance in pointing about the geocentric direction in both the short term and the medium term.

In the case of an orientable kinetic moment the present invention is distinguished from the LACOMBE article by the use of two advantageously orthogonal coils which can generate a dipole in any direction in the roll/yaw plane (not just at 45°) and by the calculation of the coil dipoles not only according to the roll but also according to the yaw as measured by the Pole Star sensor and components of external disturbances estimated in real time onboard by the control logic. This makes it possible to improve performance in yaw from typically 0.15° to 0.02°.

Like the GOEL and RAJARAM reference above, and in the case of a satellite with fixed kinetic moment in pitch, the present invention proposes magnetic control for the short-term and long-term control of roll and yaw. For the purposes of short-term control, filtering of the roll angle is replaced by state variable techniques on estimated roll and yaw angles and angular speeds and for long-term control by state variable techniques on estimated attitude angles and external disturbances, using measurements by the Earth and Pole Star sensors. Nutation damping and disturbing torque compensation performance is therefore significantly improved, typically to 0.02° as compared with 0.15°.

As in the article by TSUCHIYA et al, in the case of an orientable kinetic moment the fast loop of the present invention uses state variable control techniques and estimation of the roll and yaw angular speeds, but the estimator used is a full fourth order estimator processing the roll and yaw as measured by the Earth and Pole Star sensors. This can be a non-minimal Luenberger observer ("The synthesis of regulator logic using state-variable concepts" published in "Proceedings of the IEEE", vol 58, no 11, November 1970, pp. 1803–1811) or an asymptotic gain KALMAN filter ("Spacecraft attitude determination and control", WERTZ (editor), Reidel Publishing Company, Netherlands, 1977). This filters the sensor measurement noise and improves control performance simultaneously.

Furthermore, the present invention provides various modes of orientable kinetic moment, including the case where the kinetic moment in yaw is varied by the combination of one momentum wheel and one reaction wheel or by two wheels in a V configuration and one reaction wheel or by a pivoted momentum wheel.

As compared with U.S. Pat. No. 4,521,855 in which conventional TERASAKI type control ("Dual reaction wheel control for spacecraft pointing" published in Proceedings of the symposium of attitude stabilization and control of dual spin spacecraft, AEROSPACE Corporation, El Segundo, Calif., Aug. 1967) is applied to short-term roll/yaw control and by virtue of estimation and state variable techniques applied to the roll and yaw angular speeds the fast loop of the present invention (orientable kinetic moment) provides faster resetting of these speeds to zero and therefore improved damping of nutation of the satellite pitch axis.

Finally, in comparison with the article by HUBERT and BRUNO ("Nutation damping using a pivotable momentum wheel" published in Journal of Guidance, Control and Dynamics, vol. 12, no 5, Sept–Oct. 89, pp. 756–757) the present invention, in the case of a satellite with a pivoted momentum wheel, uses quasi-linear control as a function of roll and yaw angles measured by the Earth and Pole Star sensors and also of the roll and yaw angular speeds estimated by a state observer. This filters sensor measurement noise and provides comparable if not better performance in terms of nutation damping time and pointing and short-term roll/yaw stabilization residual errors.

In conclusion, it may be said that the originality of the present invention is to propose, for three-axis stabilized satellites in near-Equatorial orbit, a short-term and long-term roll/yaw control system using a Pole Star sensor associated with an Earth sensor in association with either two magnetic coils in the case of fixed kinetic moment satellites or momentum wheels and/or reaction wheels and two coils in the case of orientable kinetic moment three-axis stabilized satellites.

Objects, features and advantages of the invention will emerge from the following description given by way of non-limiting example with reference to the appended drawings.

DETAILED DESCRIPTION OF THE PREFERRED EMBODIMENT

Any satellite in orbit about the Earth has a direct orthonomic frame of reference Xi Yi Zi whose axes are fixed with respect to inertial space with Xi directed towards the vernal point γ, Zi towards geographical North and Yi completing the trihedron, for example.

Figure 1:
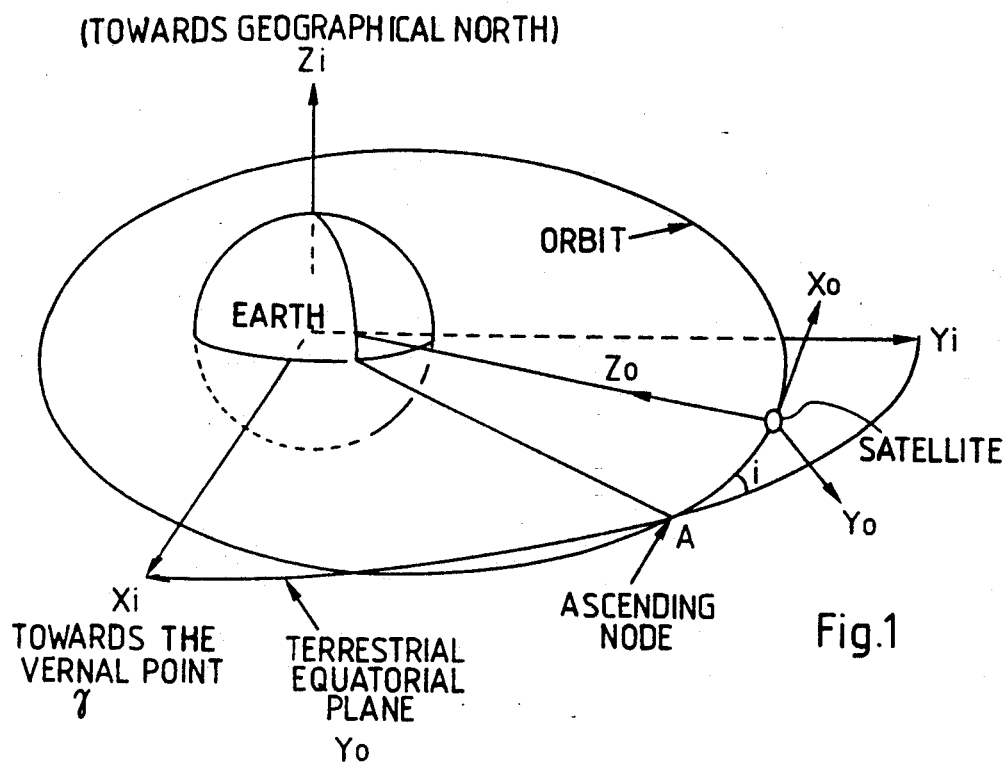
FIG. 1 is a diagram illustrating the concept of an inertial frame of reference (Xi, Yi, Zi) and a local orbital frame of reference (Xo, Yo, Zo)

A so-called local orbital frame of reference Xo Yo Zo at the center of mass of the satellite has Zo directed towards the center of the Earth, Yo parallel to the negative normal to the orbital plane and Xo completing the trihedron and directed towards the same side as the linear speed vector in the orbit. FIG. 1 shows the geometry of the frames of reference (Xi Yi Zi) and (Xo Yo Zo) in the case of a satellite in near-Equatorial (typically 10° or less inclination) terrestrial orbit.

Figure 2:
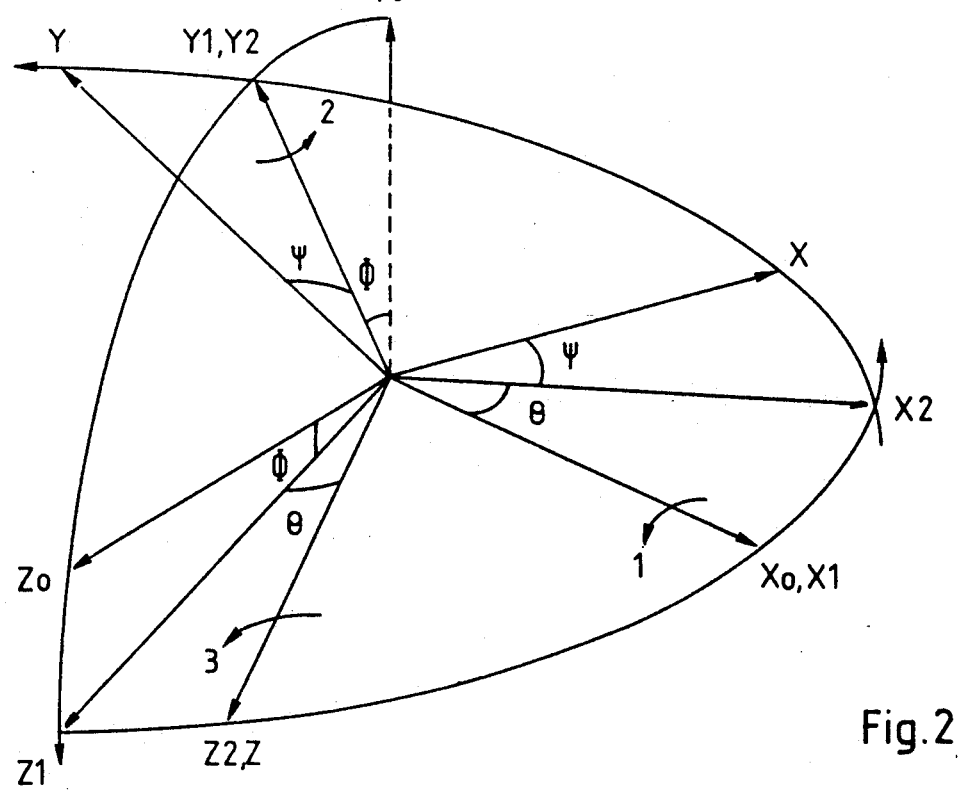
FIG. 2 is a diagram illustrating the concepts of roll, pitch and yaw.

The satellite is stabilized on three axes (hence the expression "three-axis stabilized satellite") by maintaining a frame of reference X Y Z related to the satellite as close as possible to the "reference" frame of reference Xo Yo Zo. Three angles phi Φ, theta Θ and psi Ψ define the instantaneous position of the satellite frame of reference X Y Z relative to the frame of reference Xo Yo Zo, as shown in FIG. 2, for example.

The standard terminology and conventions are as follows:

Φ is called the roll angle and represents the pointing error about the reference axis Xo;

Θ is called the pitch angle and represents the pointing error about the reference axis Yo;

Ψ is called the yaw angle and represents the attitude error about the reference axis Zo;

X is called the roll axis;

Y is called the pitch axis; and

Z is called the yaw axis.

The satellite to which the present invention applies is a three-axis stabilized satellite with an onboard kinetic moment about the pitch axis which has a non-null value at all times; it can be shown that in this case movement about the pitch axis is decoupled from roll and yaw movements which are coupled to each other.

The remainder of this description is concerned exclusively with controlling movement about the roll and yaw axes in the short term and in the long term and considers the case of fixed kinetic moment in pitch (case 1) and kinetic moment in pitch orientable about an axis near or included in the roll/yaw plane of the satellite (case 2).

Figure 3:
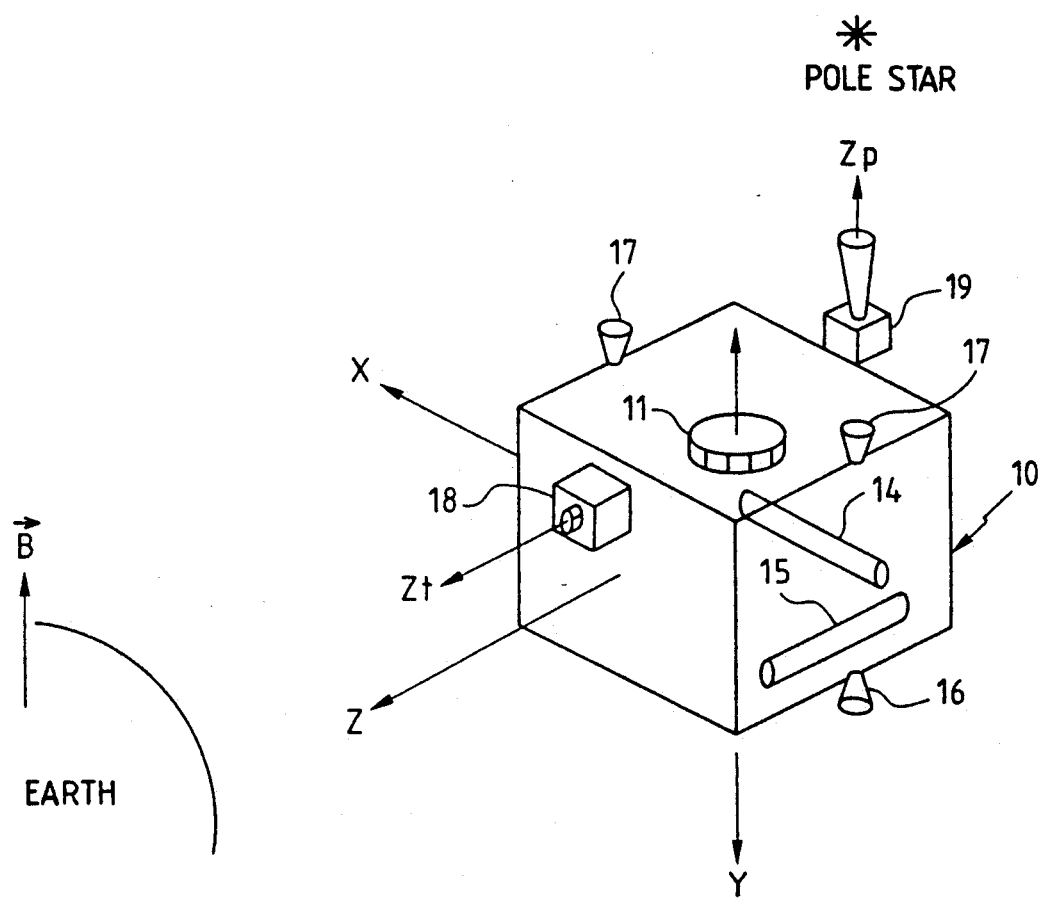
FIG. 3 is a schematic view of an attitude control system in accordance with the invention onboard a satellite (fixed kinetic moment)

FIG. 3 shows a satellite 10 with a fixed kinetic moment; its general structure is conventional and will not be described in detail here; in this example it includes a momentum wheel 11 rotating about a pitch axis.

Figure 4:
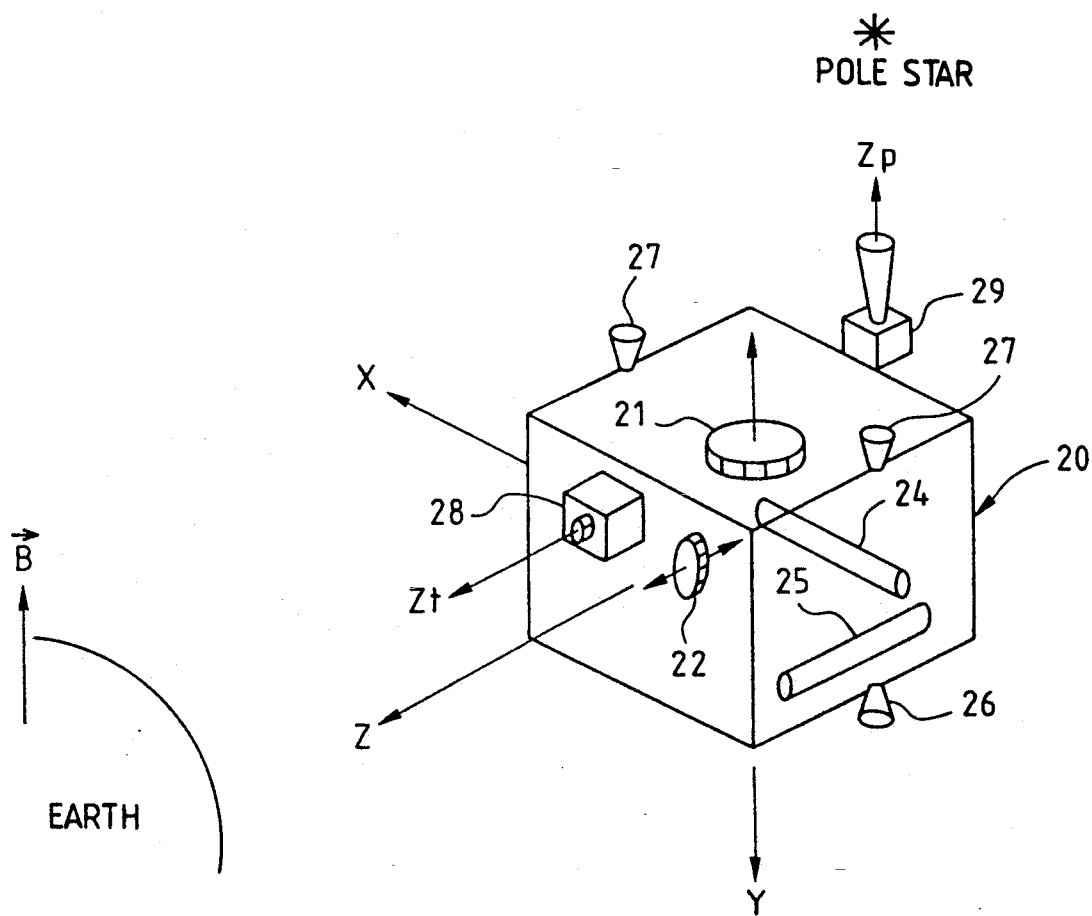
FIG. 4 is an analogous schematic view in the case of an orientable kinetic moment produced by a pitch momentum wheel and a yaw reaction wheel.
Figure 5:
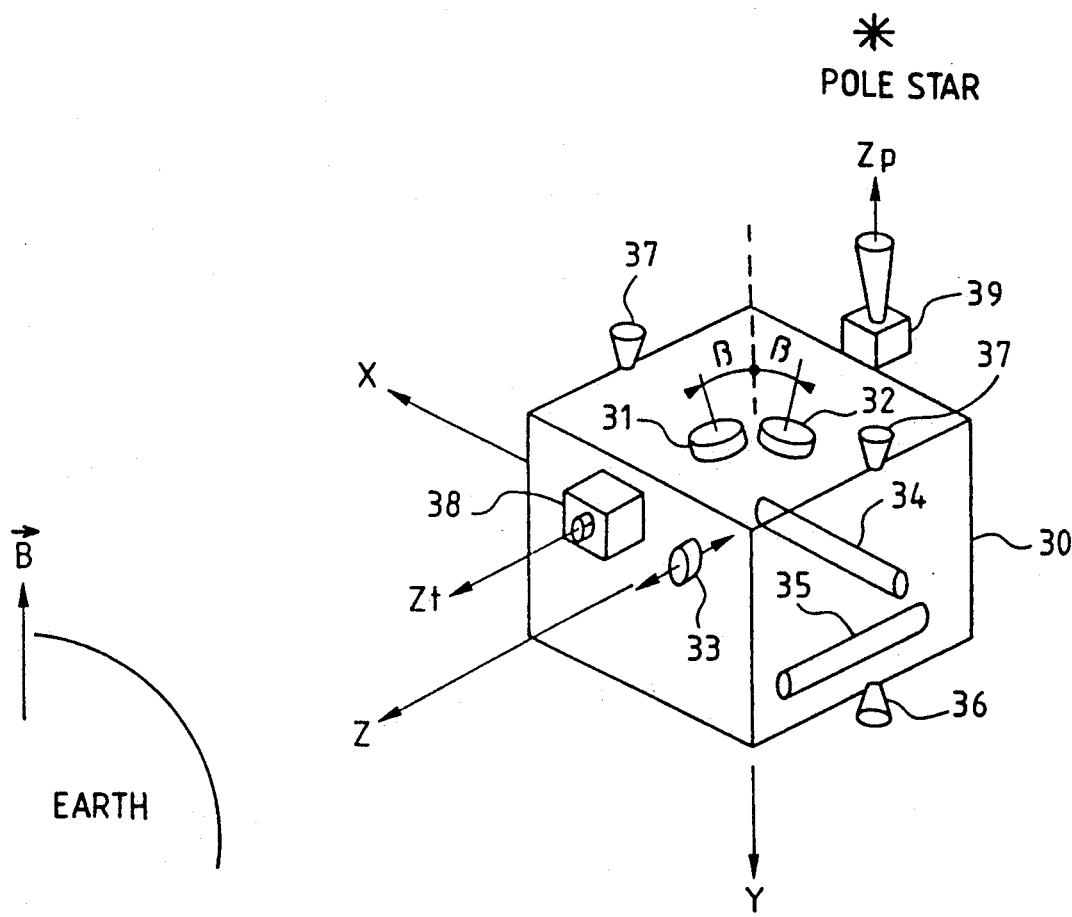
FIG. 5 is an analogous schematic view in the case of an orientable kinetic moment produced by two momentum wheels in a V configuration and one reaction wheel.
Figure 6:
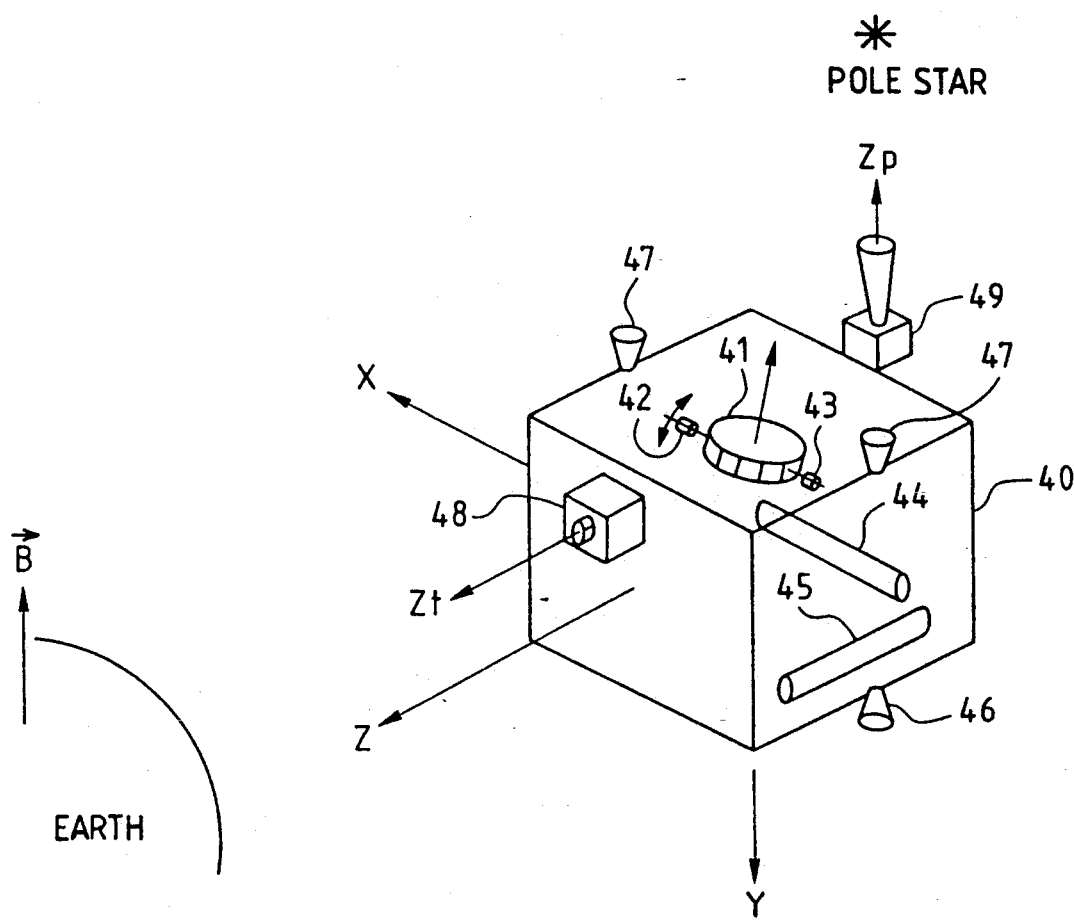
FIG. 6 is an analogous schematic view in the case of an orientable kinetic moment produced by a pivoted momentum wheel.

FIGS. 4, 5 and 6 show satellites 20, 30 and 40 with an orientable kinetic moment.

The FIG. 4 satellite 20 includes a pitch momentum wheel 21 and a reaction wheel 22 whose axis is oriented along the yaw axis.

The FIG. 5 satellite 30 includes two momentum wheels 31 and 32 disposed symmetrically to the pitch axis Y at the same angle β and advantageously a reaction wheel 33 whose axis is in the roll-yaw plane, in this example parallel to the yaw axis Z, and which is used should either of the two momentum wheels fail. Additionally, the rotation axes of the three wheels are near or in a common meridian plane offset by an angle α to the pitch/yaw plane (in this example α=0 to make the drawing clear).

The FIG. 6 satellite 40 has a single momentum wheel 41 mounted on a pivot axis parallel to the roll-yaw plane, in this example near the roll axis. The geometry of the pivoted momentum wheel is such that it generates a kinetic moment having a dominant component in pitch and a usually lower and variable component in the roll/yaw plane, preferably near the yaw axis. For example, the pivot may be implemented by means of a support provided with an electric motor 42 and an angular position sensor 43.

The satellites 10, 20, 30 and 40 (whether of fixed or orientable kinetic moment) also include two magnetic coils 14, 24, 34, 44 and 15, 25, 35, 45, respectively. The magnetic coils either have a core or do not have a core and their axes are at right angles to each other and disposed either in the roll/yaw plane of the satellite (the XZ plane) or near this plane.

The interaction of the magnetic dipoles M1 and M2 generated by the two coils with the terrestrial magnetic field B at the orbital position of the satellite creates a magnetic control torque defined according to LAPLACE's law by the vector product of the resultant vector M of M1 and M2 with the vector $\bar{B}$. This torque therefore has components on the roll and yaw axes of the satellite.

The satellite has other actuators, for example at least two thrusters 16, 26, 36, 46 and 17, 27, 37, 47 capable of generating torque about the roll and/or yaw axes (and in particular about the normal to the plane of the V configuration momentum wheels in the case of FIG. 5). These are thrusters used for orbit control, for example. These actuators are controlled by backup logic which takes over if the magnetic field is severely disturbed or in the event of a malfunction of the coils.

Finally, roll and pitch satellite pointing errors are sensed by an Earth sensor 18, 28, 38 and 48 whose optical axis Zt is preferably near the yaw axis Z of the satellite and the yaw error is determined using a Pole Star sensor 19, 29, 39 or 49 whose optical axis Zp is preferably near the pitch axis Y but in the opposite sense and whose field of view is sufficiently wide, typically 2×(orbital inclination+3°), and which has adequate sensitivity to track the Pole Star at all points on the satellite orbit.

Figure 7:
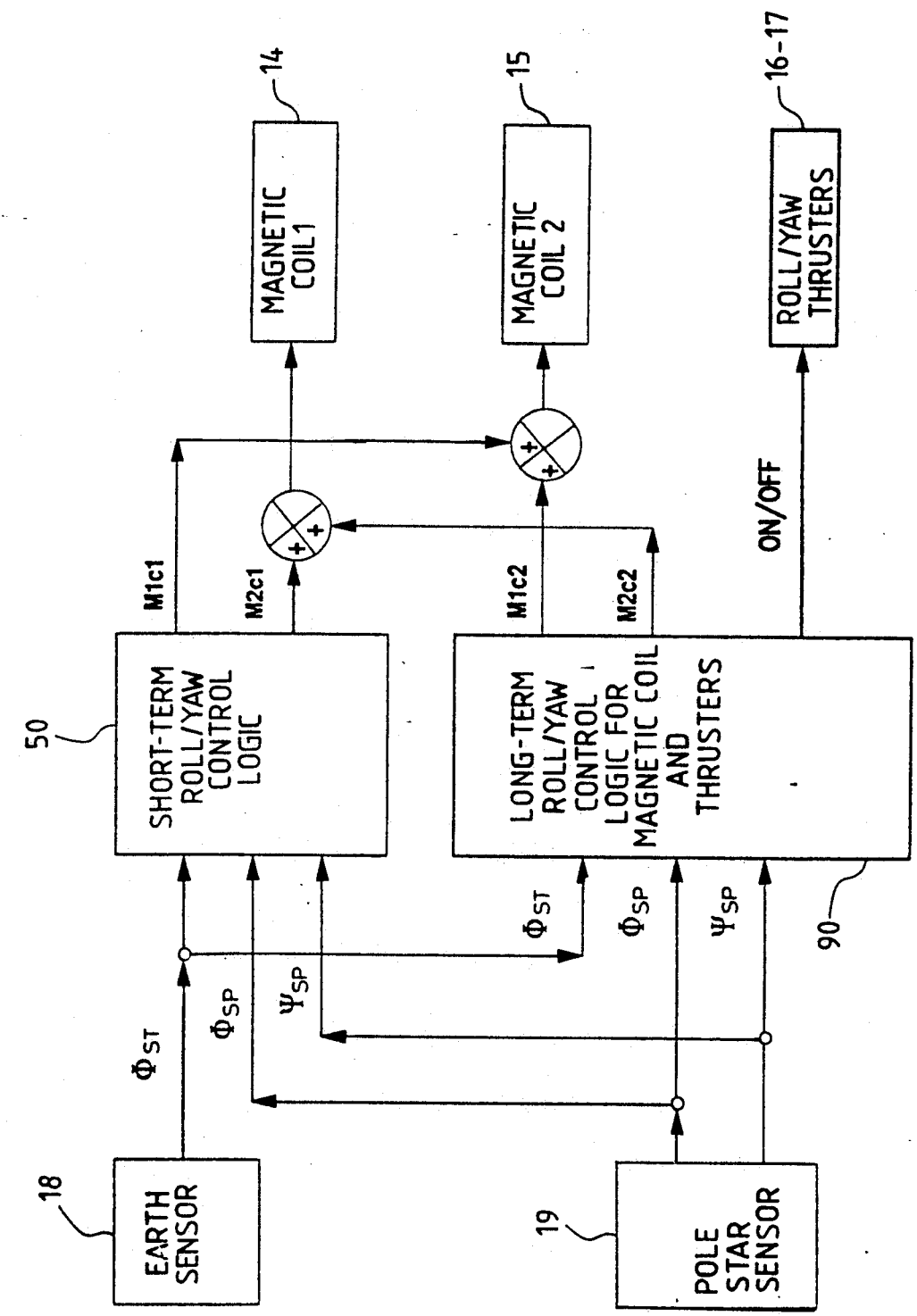
FIGS. 7 through 10 are general block diagrams of roll/yaw attitude control systems of the satellites from FIGS. 3 through 6, respectively.

FIG. 7 is a roll/yaw control block diagram based on Earth and Pole Star sensors for detecting attitude errors and on magnetic coils and thrusters in the case of the fixed kinetic moment satellite from FIG. 3.

Figure 8:
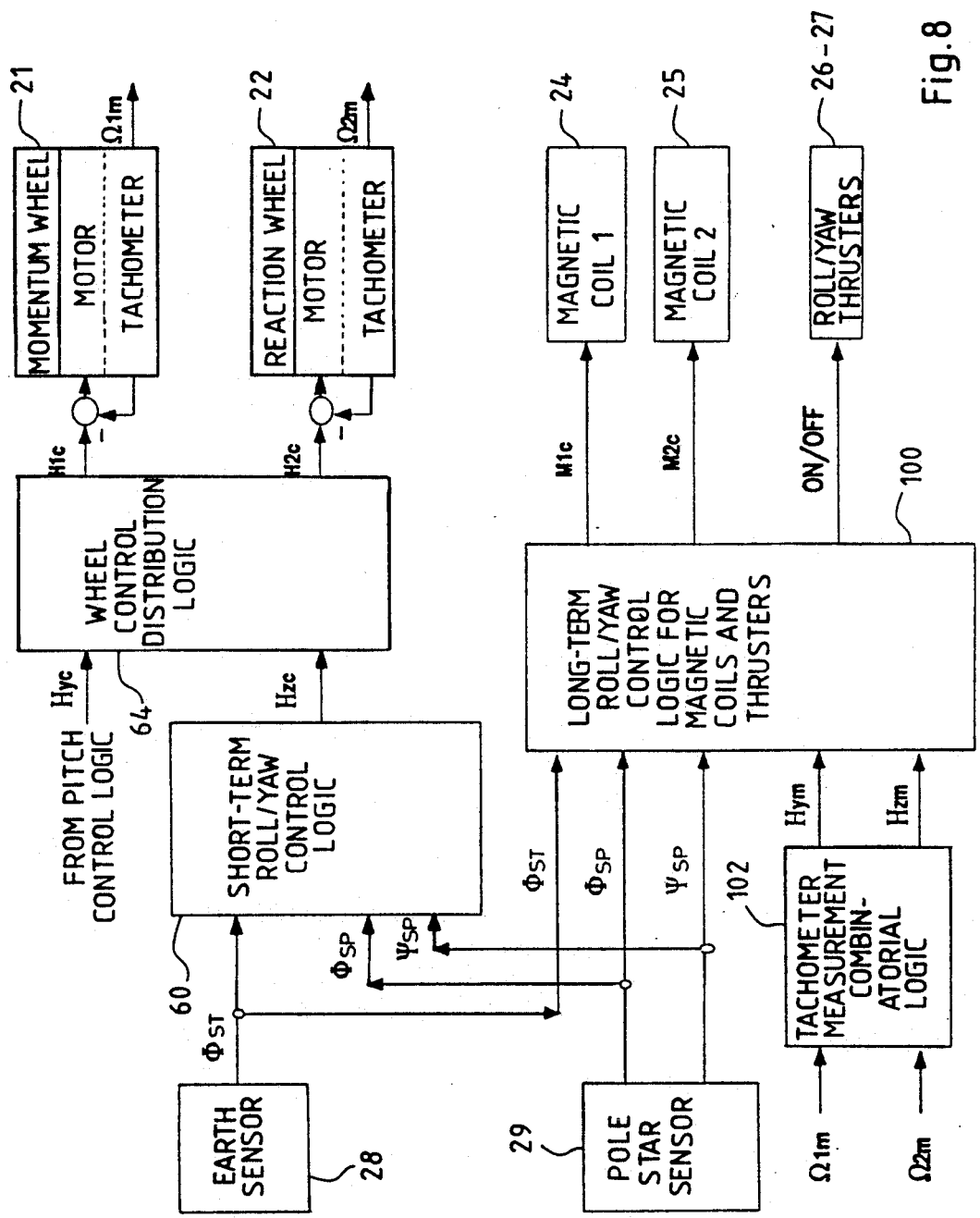
Figure 9:
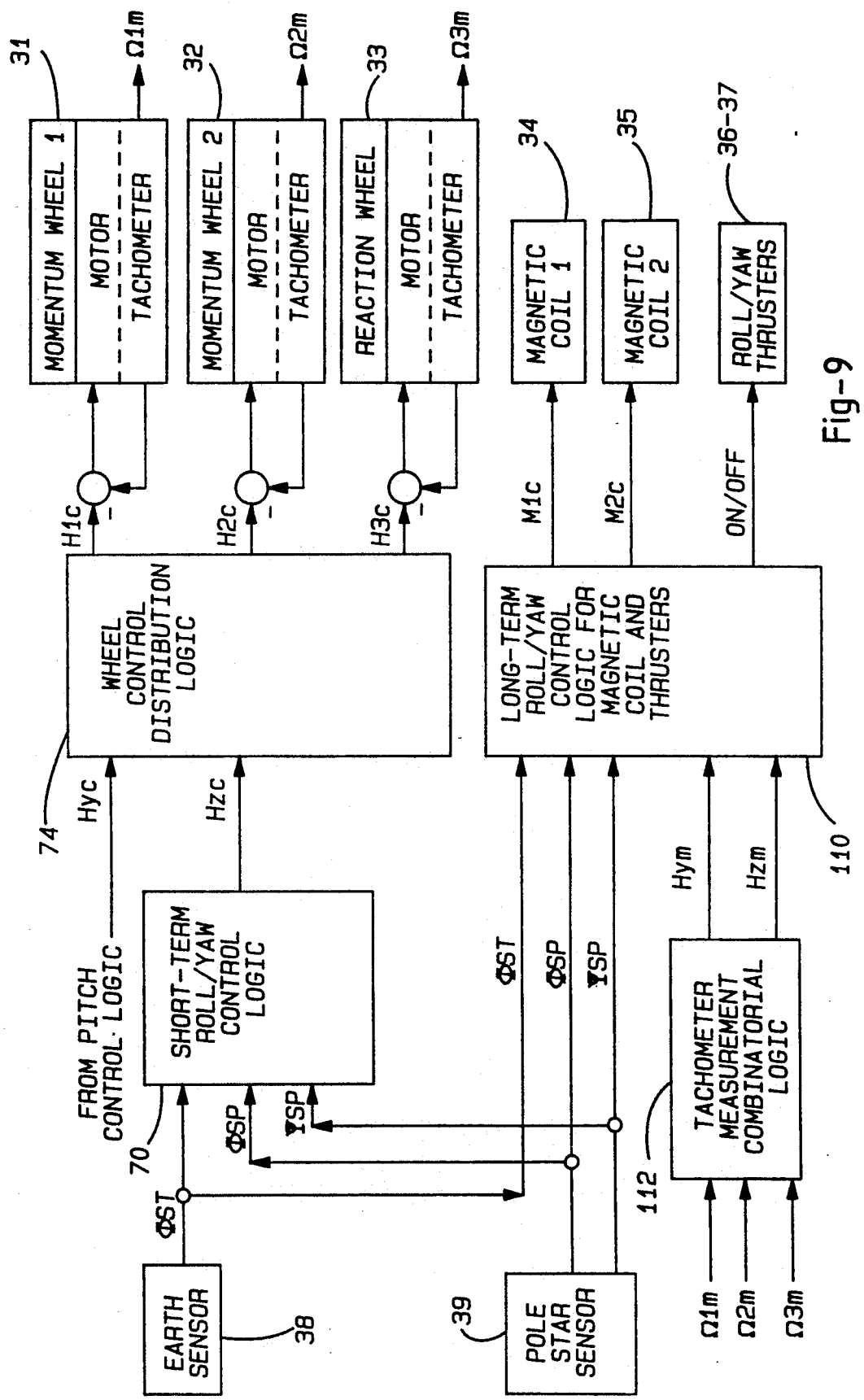
Figure 10:
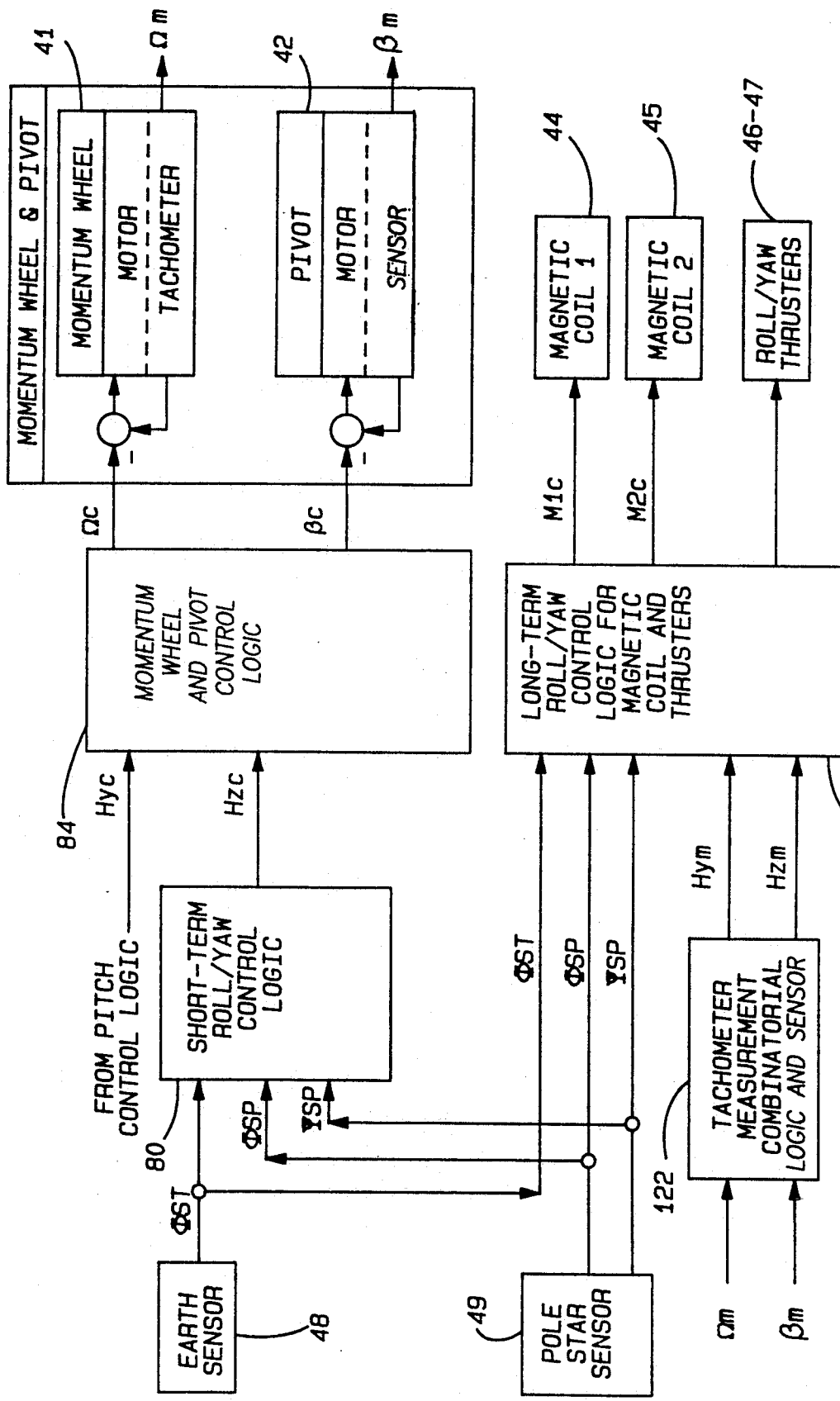

FIGS. 8 through 10 show roll/yaw control block diagrams based on Earth and Pole Star sensors and on wheels, magnetic coils and thrusters in the case of the satellite from FIGS. 4 through 6.

Figure 11:
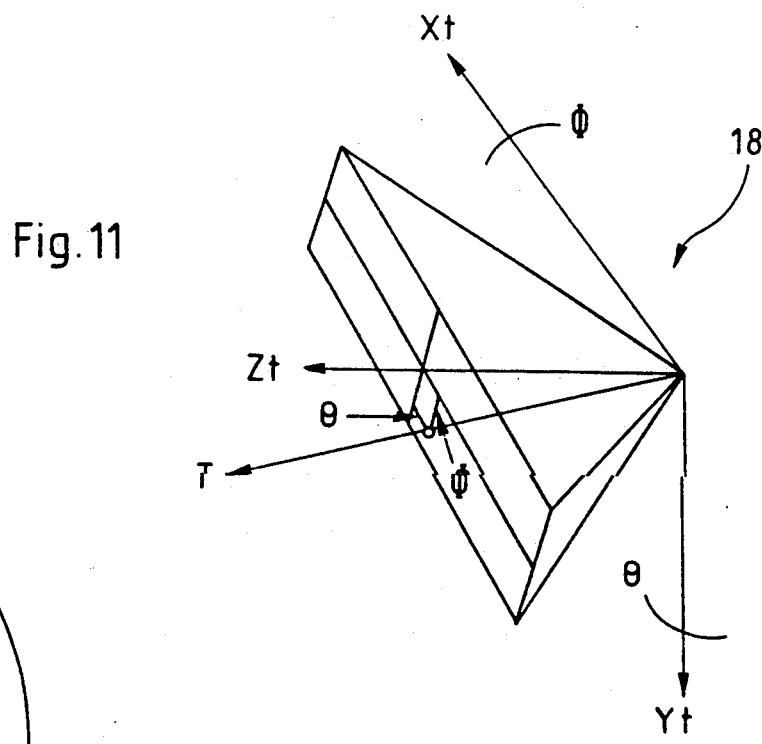
FIG. 11 is a diagram illustrating the measurement principle of a terrestrial horizon sensor.

FIG. 11 shows the geometry of direct measurement of the roll and pitch angles by the terrestrial sensor.

Figure 12:
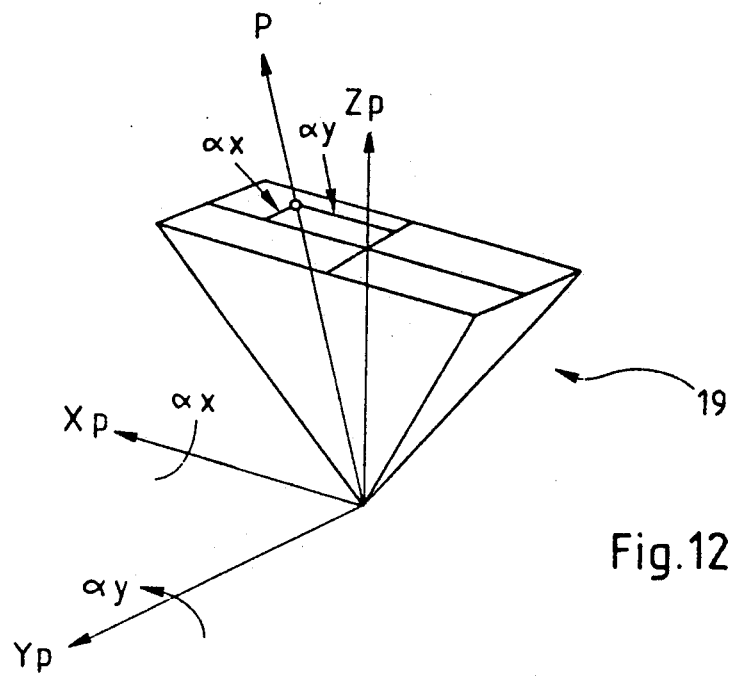
FIG. 12 is a diagram illustrating the measurement principle of a stellar sensor pointed at the Pole Star.

FIG. 12 shows the principle of measuring the Pole Star direction vector in the frame of reference Xp Yp and Zp of the stellar sensor. In the practical situation where the Xp and Yp axes are respectively parallel to the X and Z axes of the satellite and the attitude angles $\Phi$, $\Theta$ and $\Psi$ are small (less than 1°), the satellite roll $\Phi$ and yaw $\Psi$ attitude errors are deduced from the measured values $\alpha x$ and $\alpha y$ from the sensor by approximate equations of the form:

$$\Phi = \alpha x - Pzo, \Psi = \alpha y + Pxo$$

which Pxo and Pzo are the components of the satellite-Pole Star unit vector in the local orbital frame of reference (depending on the instantaneous orbital position of the satellite and of the position of the star in inertial space).

The various parts of the attitude control system in accordance with the invention are interconnected by a short-term control loop and a long-term control loop respectively shown in detail in FIGS. 13 through 16 and FIGS. 17 through 20.

The main objective of the short-term control loop is to damp nutation of the pitch axis Y of the satellite by reducing to zero angular speeds about the roll axis X and the yaw axis Z and by returning the roll and yaw angles to within specified ranges.

This loop 50, 60, 70 or 80 respectively for the satellite 10, 20, 30 or 40 embodies short-term roll/yaw control logic based on a state estimator and a constant or variable gain controller.

A state estimator filter 51, 61, 71 or 81 which is for example of the non-minimal Luenberger type (see "The synthesis of regulator logic used in space-variable concepts" published in Proceedings of the IEEE, vol. 58, no 11November 1970, pp. 1803-1811) or an asymptotic gain KALMAN filter (see WERTZ (Editor) "Spacecraft attitude determination and control", Reidel Publishing Company, Netherlands, 1977) provides real time estimates of the roll and yaw angles and the roll and yaw angular speed of the satellite from the measurements provided by the Earth and Pole star sensors.

Then a controller 52, 62, 72 or 82 (see for example JACQUOT "Modern digital control systems", Marcel Decker Inc, New York and Basel, 1981) which is of the preselected gain type, for example, determines the yaw torque Uc to be produced either by the magnetic coils in the case of a fixed kinetic moment satellite (case 1) or by the momentum wheels and/or reaction wheels in the case of an orientable kinetic moment satellite (case 2).

In the case of a fixed kinetic moment satellite (FIG. 13), the control torque is converted into control magnetic dipoles M1c1 and M1c2 for the coils by means of a distribution matrix 53 using an onboard model of the terrestrial magnetic field, for example the inclined dipole model described in "Spacecraft attitude determination and control", WERTZ (Editor), Reidel Publishing Company, Netherlands, 1977) and based on the geometry of the layout of the coils on the satellite.

In the case of an orientable kinetic moment satellite, the control torque is converted by a corrector 63, 73 or 83 which is of the proportional-integral type, for example (see JACQUOT Raymond G. "Modern digital control systems", Marcel Decker Inc, New York and Basel, 1981) into a set point kinetic moment Hzc for the reaction wheel in FIG. 4 or for the momentum wheels in FIG. 5 or for one of them and the reaction wheel or for the pivoted wheel in FIG. 6.

Figure 13:
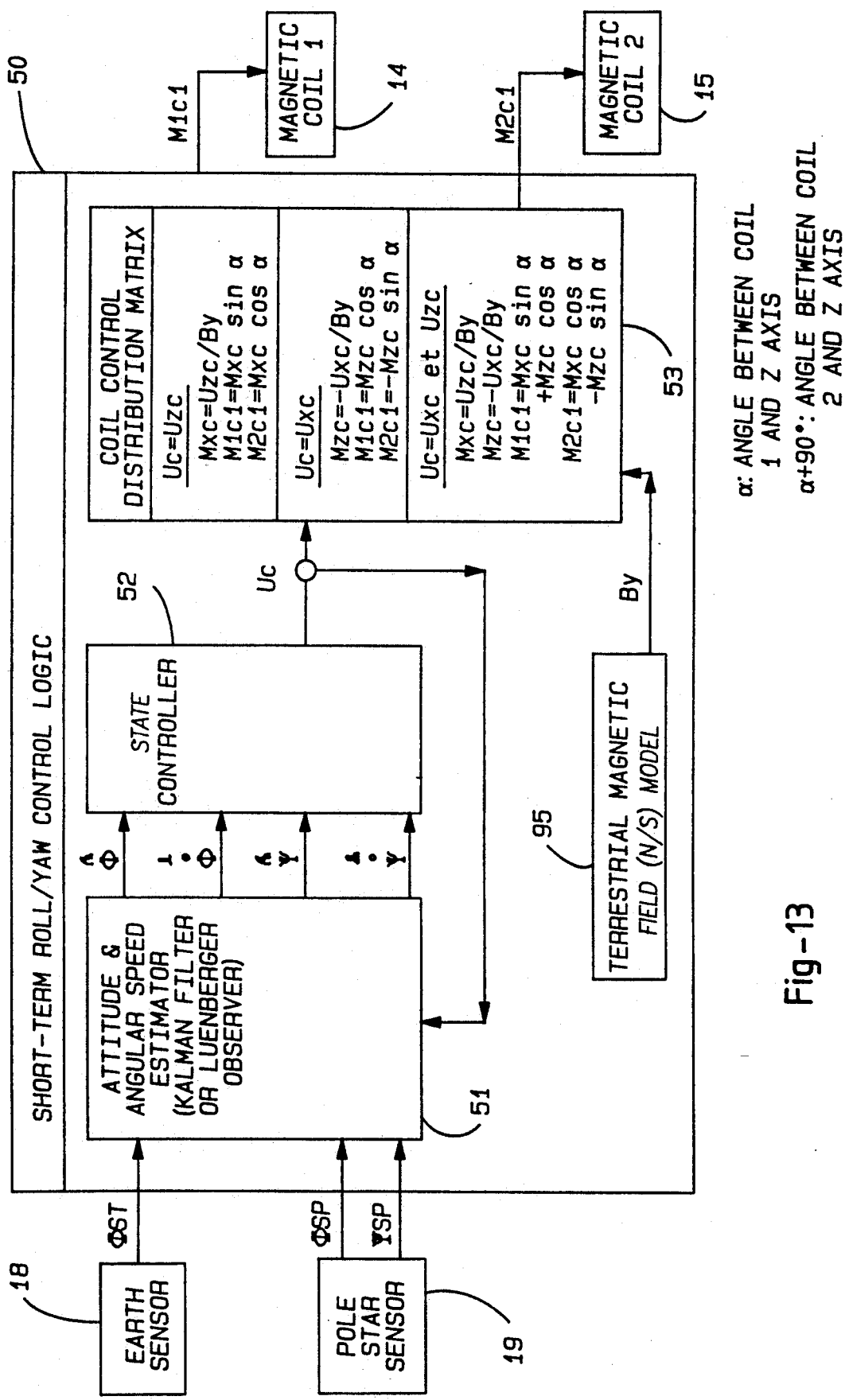
FIGS. 13 through 16 are block diagrams of short-term roll/yaw control loops from FIGS. 7 through 10, respectively.
Figure 14:
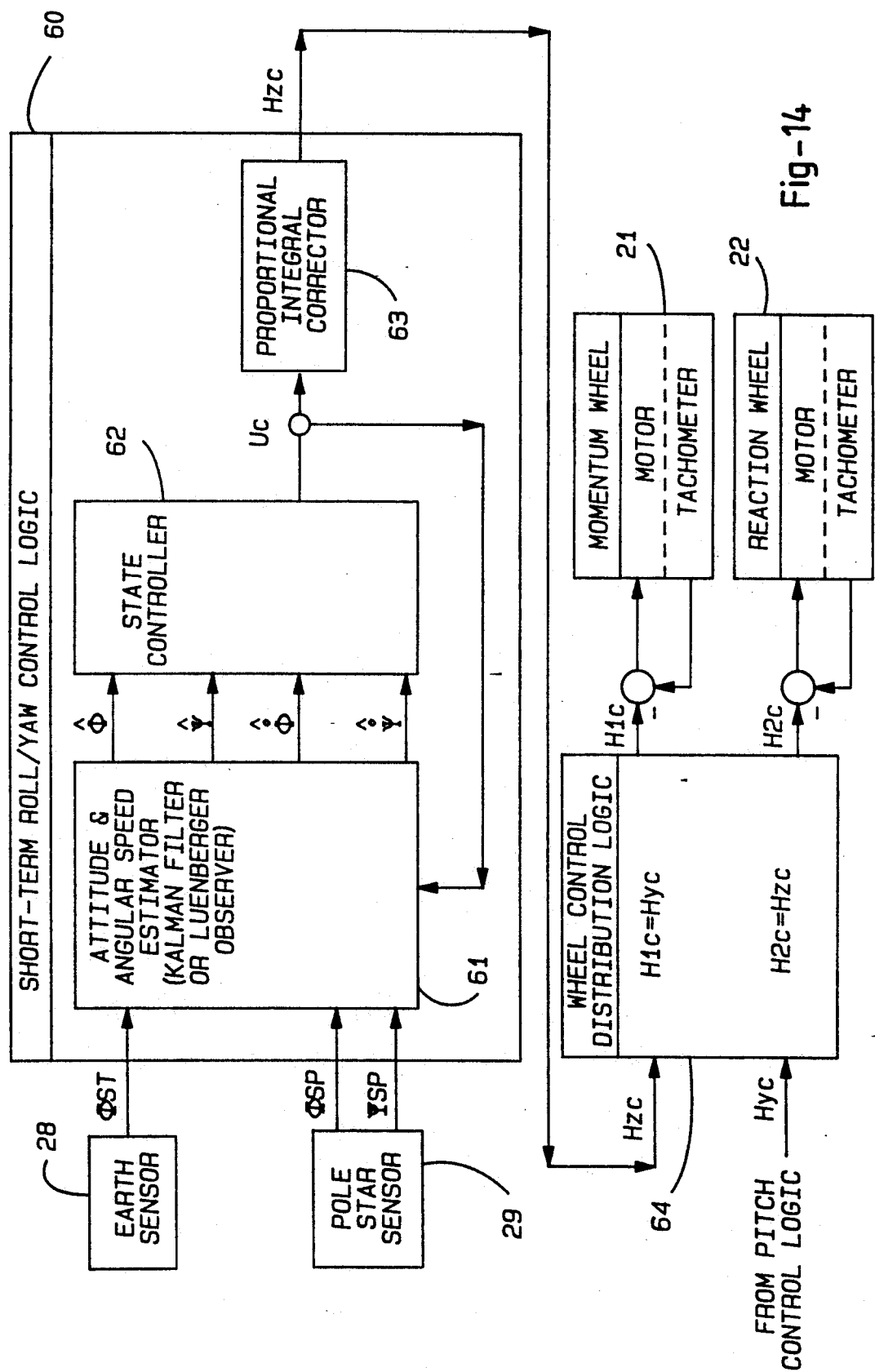
Figure 15:
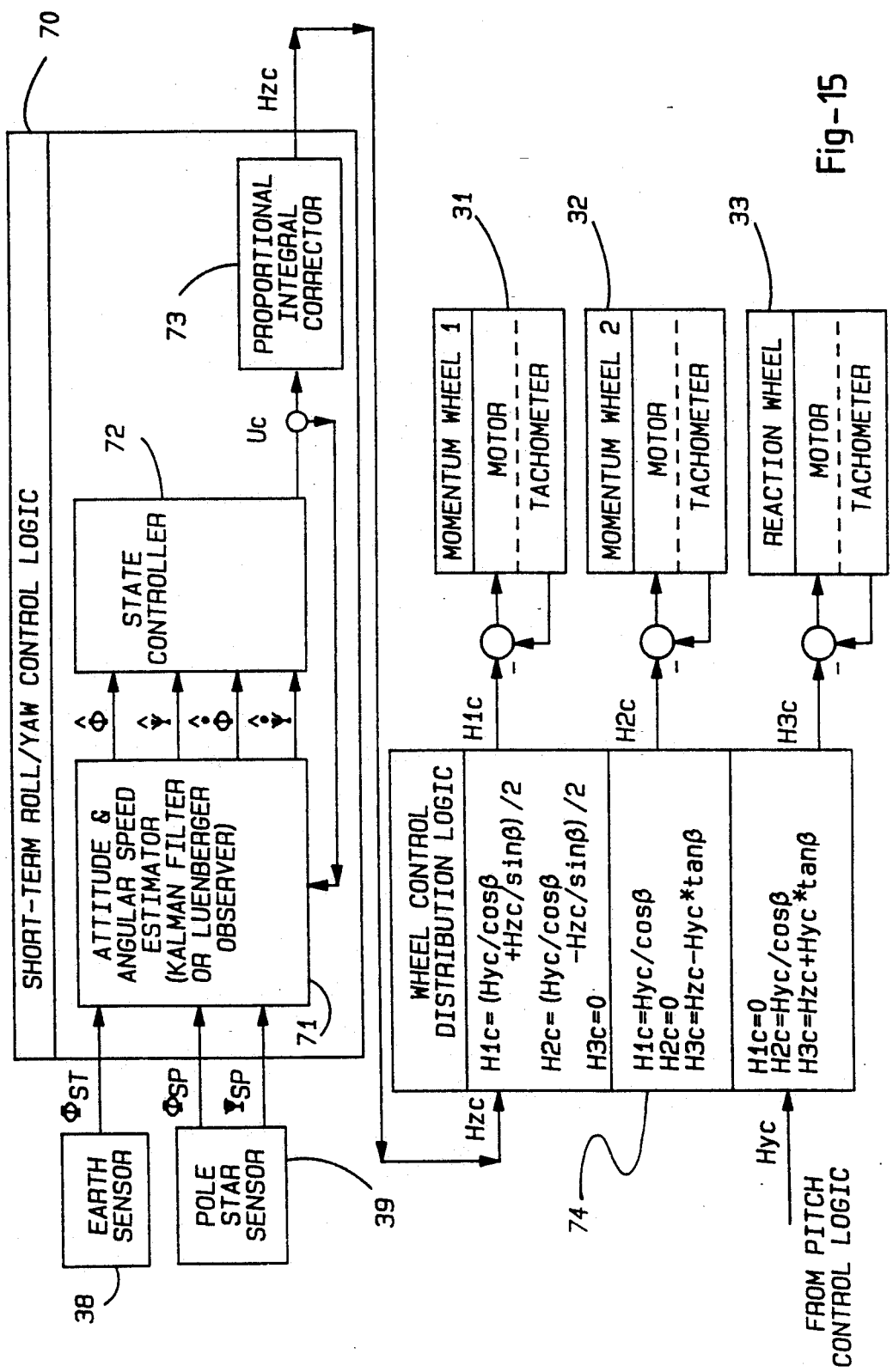
Figure 16:
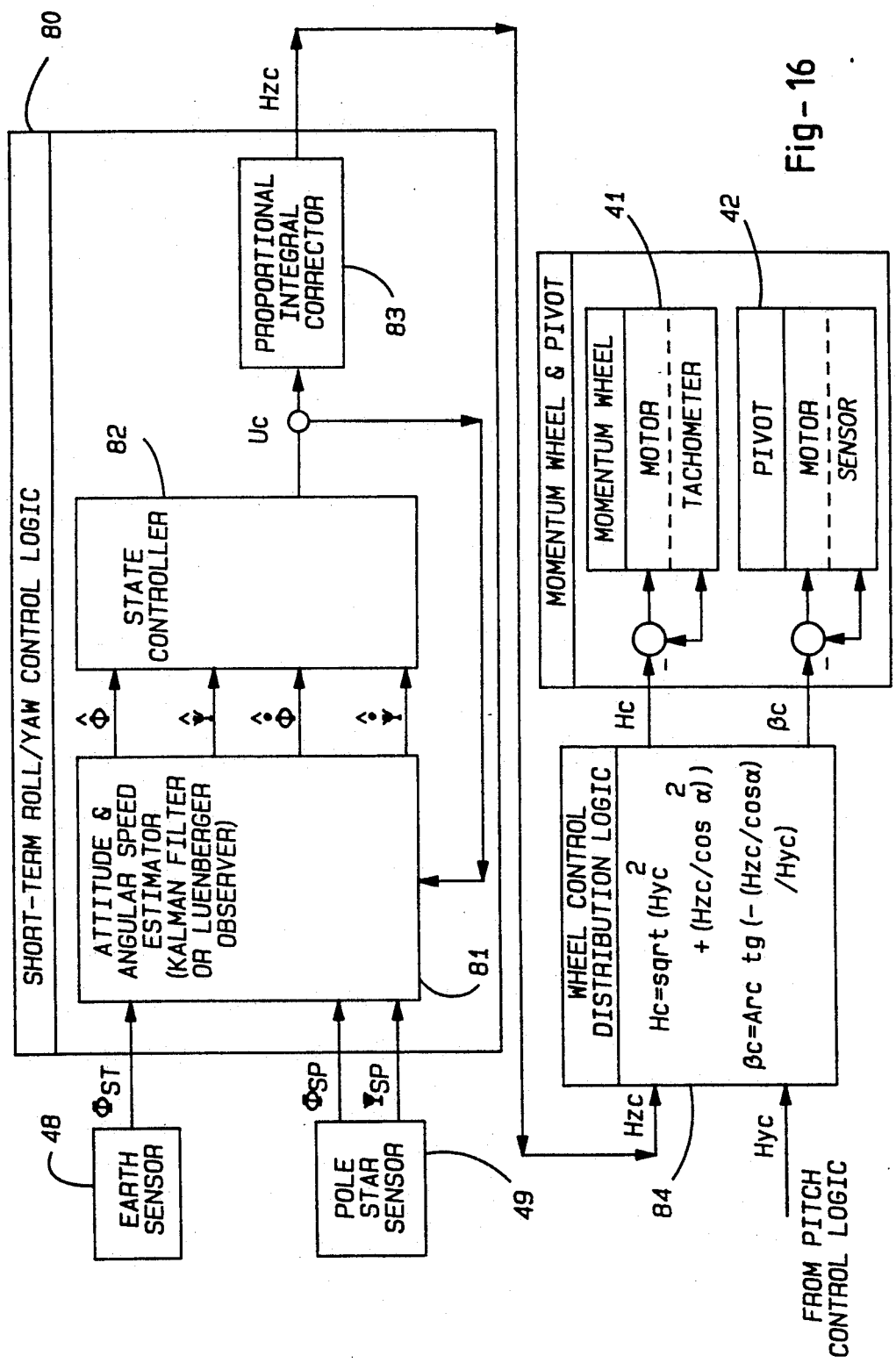
Figure 17:
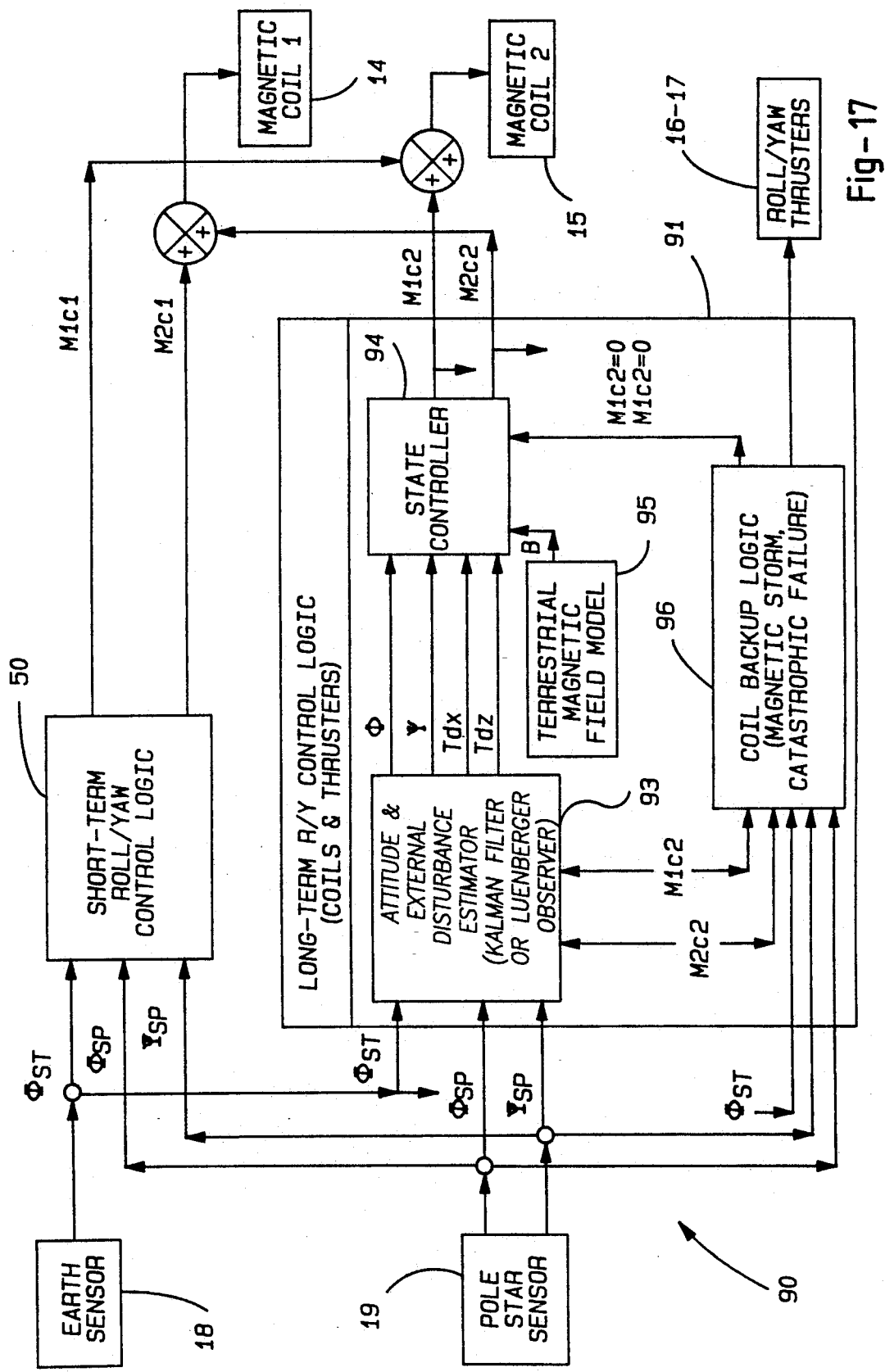
FIGS. 17 through 20 are block diagrams of long-term roll/yaw control loops from FIGS. 7 through 10, respectively.
Figure 18:
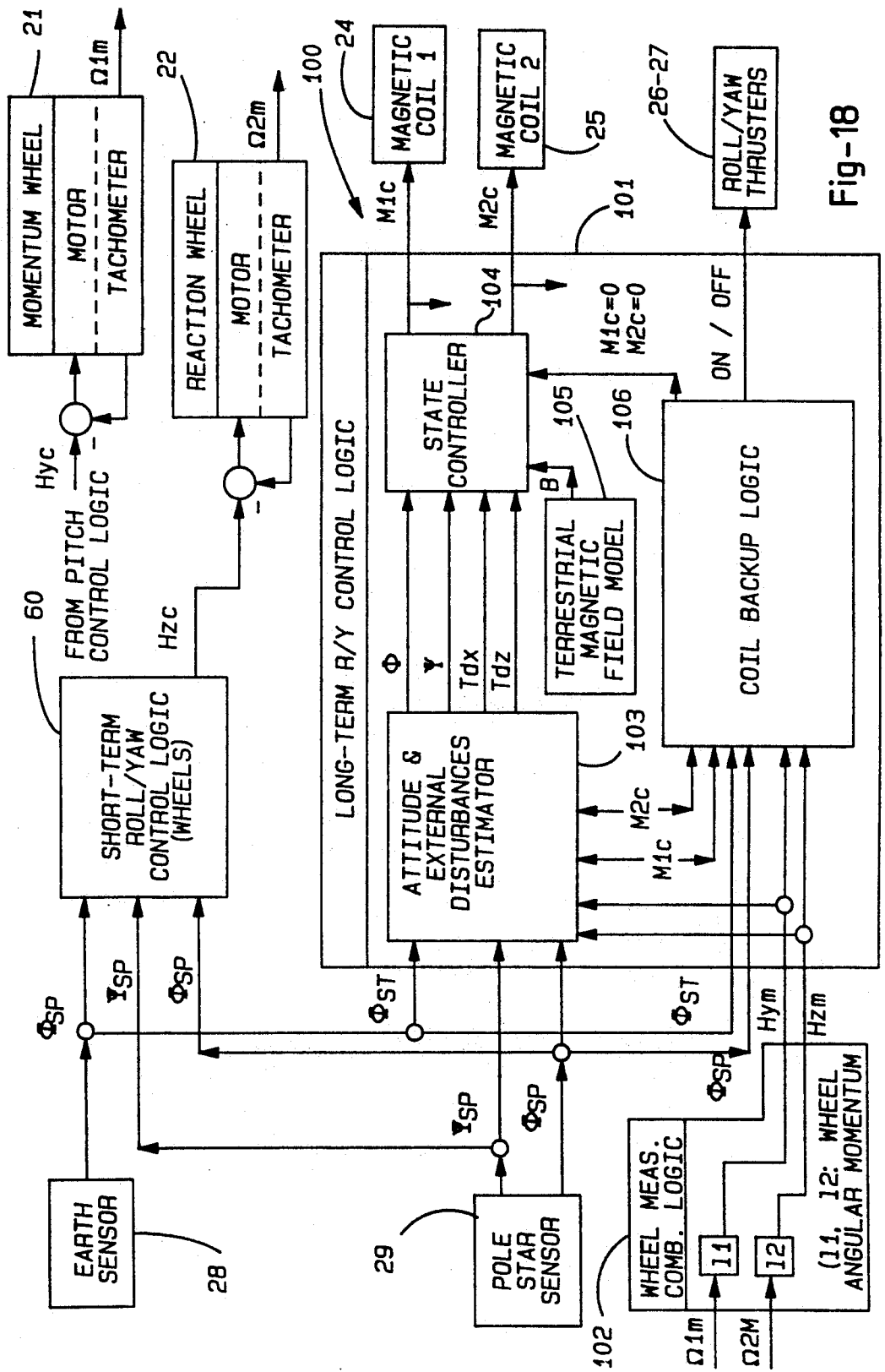
Figure 19:
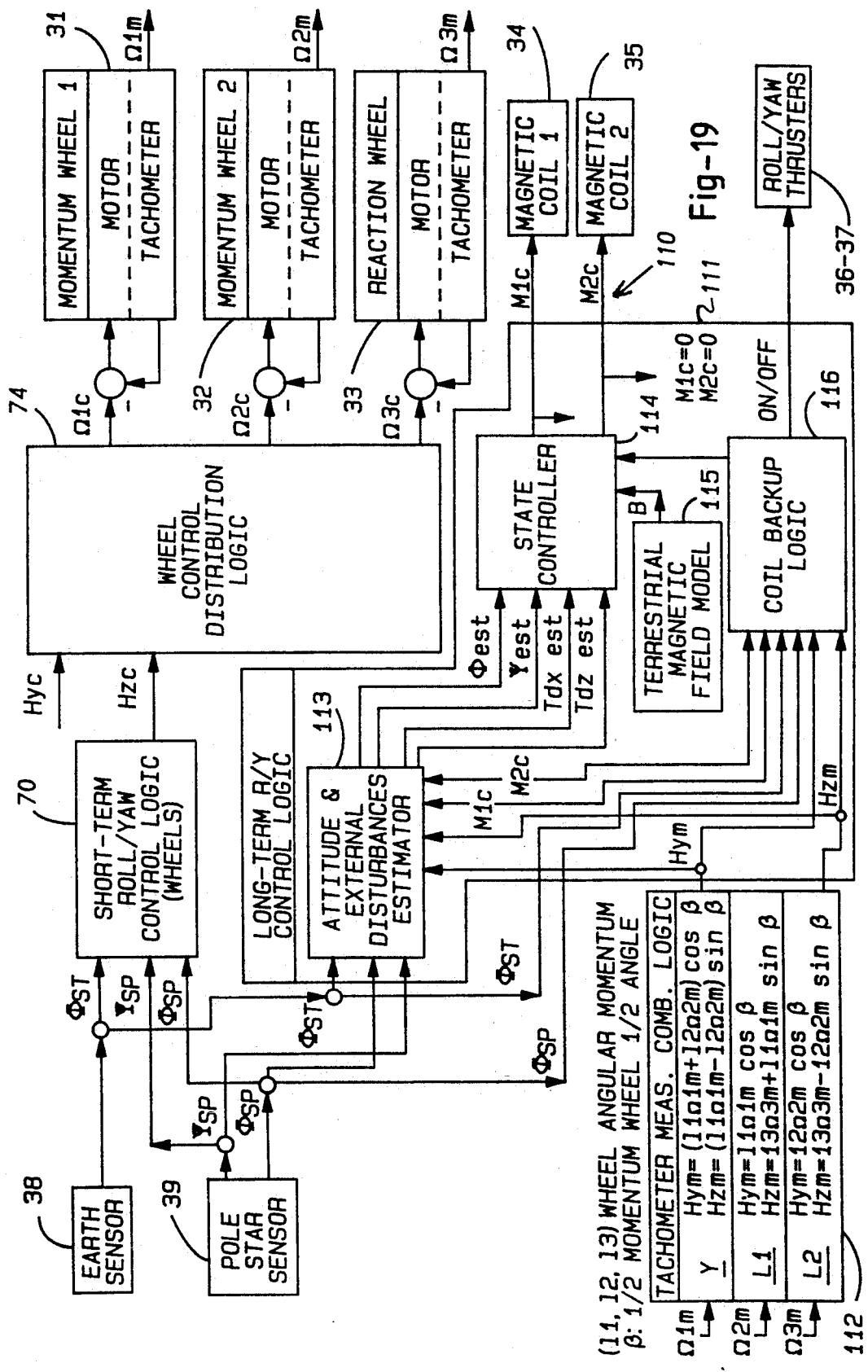
Figure 20:
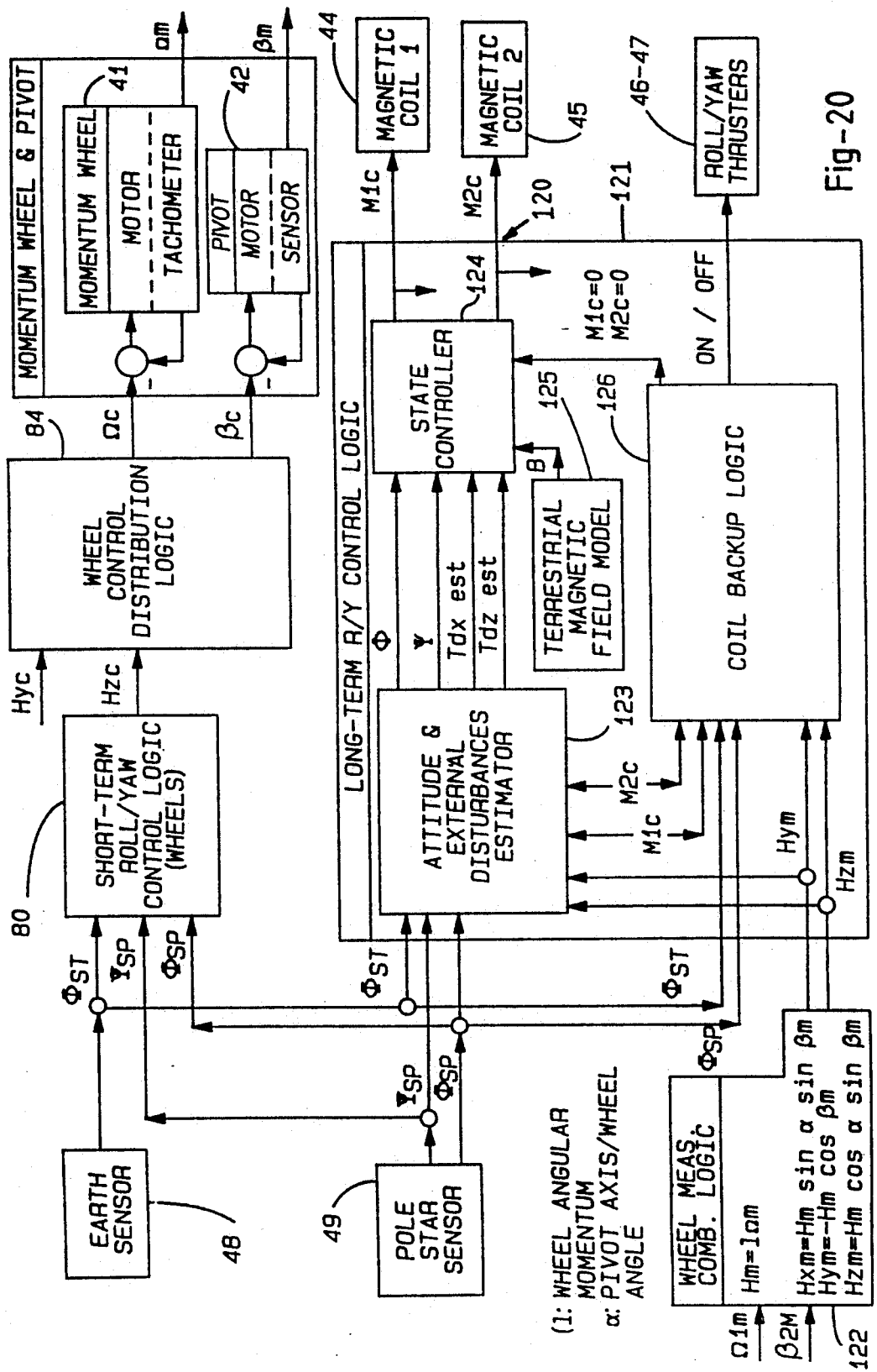

The signals are applied to the respective actuators by distribution logic 64, 74 or 84 (not shown in FIG. 13).

The object of the long-term control loop is to keep the roll angle $\Phi$ and the yaw angle $\Psi$ within specified ranges (for example, ±0.07° for the roll angle and ±0.07° for the yaw angle) despite the effect of external disturbing torques, in particular the aerodynamic torque and the gravity gradient at low altitudes or the solar radiation pressure torque at high altitude.

To achieve this objective in the case of the fixed kinetic moment satellite (FIG. 17, loop 90), the information from the Earth and Pole Star sensors is processed by long-term roll/yaw control logic 91 which controls the magnetic dipoles of the coils or activates the other actuators such as thrusters.

This logic embodies a state observer 93, for example an asymptotic gain KALMAN filter (see above), which uses the measurements from the sensors to estimate in real time the satellite roll and yaw errors and the components of external disturbances, in particular the first terms of Fourier series expansions up to the second order.

In the case of the orientable kinetic moment satellite (FIGS. 18 through 20, loop 100, 110 or 120), the information from the Earth and Pole Star sensors and the information provided by the tachometers fitted to the wheels (even the position sensor of the pivoted wheel) are processed by long-term roll/yaw control logic 101, 111 or 121 to control the magnetic dipoles of the roll and yaw coils or to activate other actuators such as thrusters.

In this case the tachometers associated with the wheels provide a continuous measurement of their speed of rotation and the tachometer and the position sensor of the pivoted wheel sense the angular speed and the angular position of the pivot. In each case the output signals are processed by combinational logic 102, 112 or 122 using simple mathematical formulae based on the geometry of the wheels to determine in particular the respective components Hym and Hzm of the resultant kinetic moment about the Y and Z axes.

A state estimator 103, 113 or 123 then uses not only the sensor measurements but also the parameters Hym and Hzm defined above to estimate in real time the satellite roll and yaw errors and the components of external disturbances and in particular Fourier series expansions up to the second harmonic.

Finally, whether the satellite is a fixed or orientable kinetic moment satellite, a controller 94, 104, 114 or 124 (see above) calculates the torque required to reset the attitude in accordance with the above estimated parameters and then, using a model 95, 105, 115 or 125 of the terrestrial magnetic field, the controller determines the magnetic dipoles required of the two coils M2c1 and M2c2 for a fixed kinetic moment satellite or M1c and M2c for an orientable kinetic moment satellite.

The interaction of the dipoles generated by the coils with the terrestrial magnetic field produces control torques about the roll and yaw axes whose effect is to maintain in the long term satellite roll and yaw errors within pointing specifications despite external disturbances.

Also, in the event of catastrophic failure affecting the coils or severe disturbance of the magnetic field requiring saturation control of the coils and assuming, for example, the roll and/or yaw angles are degraded and risk moving out of specification, backup logic 96, 106, 116 or 126 powers off the coils and controls the other actuators available, such as thrusters, to maintain the roll and/or yaw error within the authorized range(s).

It goes without saying that the foregoing description has been given by way of non-limiting example only and that numerous variants thereon may be put forward by one skilled in the art without departing from the scope of the invention.

There is claimed:

1. A roll/yaw attitude control system for a three-axis stabilized satellite in Equatorial or near-Equatorial orbit, said satellite having roll, yaw and pitch axes, said attitude control system comprising:
   a sensor device for sensing the attitude of said satellite in roll, yaw and pitch, said sensor device comprising a terrestrial sensor mounted on said satellite adapted to detect the Earth; and a stellar sensor mounted adjacent said terrestrial sensor and adapted to detect the Pole Star, said terrestrial sensor and said stellar sensor further sensing the roll and yaw positions of said satellite;
   an actuator device mounted to said satellite, said actuator device comprising;
   a kinetic moment system having a kinetic moment with a non-null value at all times, said kinetic moment having a dominant component along said pitch axis;
   a magnetic dipole generator system disposed at least approximately parallel to a roll/yaw plane defined by a plane containing said roll and yaw axes; and
   a set of backup actuators;
   a processor circuit connected between said attitude sensing device and said actuator device, said processor circuit comprising;
   a short-term roll/yaw control loop comprising a state estimator for estimating, on the basis of measurements by said terrestrial and stellar sensors, roll and yaw attitude angles and angular speed value; and a preselected gain controller for determining, from said estimated attitude angles and angular speed value, set point signals fed by distribution logic to at least one of said kinetic moment system, said magnetic dipole generator system, and said set of backup actuators; and
   a long-term roll/yaw control loop comprising a state estimator for estimating, on the basis of measurements by said terrestrial and stellar sensors, roll angles, yaw angles and components along the roll and yaw axes of exterior disturbing torques; a controller for determining, via distribution logic, a dipole signal to be applied to said magnetic dipole generator system; and a backup system in parallel with said controller adapted to send control signals to said set of backup actuators.

2. System according to claim 1 wherein said kinetic moment system of said actuator device has a fixed kinetic moment.

3. System according to claim 2 wherein said fixed kinetic moment system comprises a momentum wheel with its axis at least approximately parallel to said pitch axis.

4. System according to claim 2 further comprising magnetic coils connected to said satellite and wherein said set point signals supplied by said controller of said short-term control loop are applied to said magnetic coils; and further wherein said dipole signal determined by said controller of said long-term control loop is added to said set point signals.

5. System according to claim 1 wherein said kinetic moment system of said actuator device has an orientable kinetic moment with one degree of freedom about an axis approximately parallel to said roll axis.

6. System according to claim 5 wherein said kinetic moment system comprises a momentum wheel having an axis proximate said pitch axis; and a reaction wheel having an axis proximate said yaw axis.

7. System according to claim 5 wherein said kinetic moment system comprises two momentum wheels disposed about said pitch axis; and a reaction wheel having an axis proximate an intersection of each plane of the axes of said two momentum wheels with said roll/yaw plane.

8. System according to claim 5 wherein said kinetic moment system comprises a momentum wheel mounted on a single-axis pivot and capable of generating a kinetic moment having a dominant component along said pitch axis and a variable component along said roll and yaw axes.

9. System according to claim 8 further comprising an inclination actuator connected thereto for controlling said pivoted momentum wheel and wherein said pivoted momentum wheel has an angular position sensor connected to said single axis pivot and supplying a signal to said long-term control loop.

10. System according to claim 5 wherein said kinetic moment system further comprises tachometers for supplying speed measurement signals to said long-term control loop.

11. System according to claim 1 wherein said magnetic dipole generator system comprises two magnetic coils each having an axis approximately parallel to said roll/yaw plane.

12. System according to claim 11 wherein said axes of said magnetic coils are orthogonal.

13. System according to claim 12 wherein said magnetic coils are respectively oriented parallel to said roll and yaw axes.

14. System according to claim 1 wherein said short-term control loop state estimator is a LUENBERGER non-minimal observer.

15. System according to claim 1 wherein said state estimator of said short-term control loop is an asymptotic gain KALMAN filter.

16. System according to claim 1 wherein said state estimator of said long-term control loop is a KALMAN filter.

17. System according to claim 1 wherein said set of backup actuators comprises roll/yaw attitude control thrusters.

* * * * *